United States Patent [19]

Lindfors

[11] Patent Number: 5,119,264

[45] Date of Patent: Jun. 2, 1992

[54] KEYBOARD ANTI-LOCKOUT CIRCUIT

[75] Inventor: Eino A. Lindfors, Boynton Beach, Fla.

[73] Assignee: International Business Machines Corporation, Armonk, N.Y.

[21] Appl. No.: 553,926

[22] Filed: Jul. 16, 1990

[51] Int. Cl.$^5$ .................... H02H 3/247; H01H 83/12
[52] U.S. Cl. ...................................... 361/59; 307/130; 361/86
[58] Field of Search .................. 361/59, 60, 86, 88, 361/75; 307/130, 125; 364/483; 323/276, 284

[56] References Cited

U.S. PATENT DOCUMENTS 4,771,356  9/1988  Hastings ............................... 361/59

*Primary Examiner*—A. D. Pellinen
*Assistant Examiner*—Richard Elms
*Attorney, Agent, or Firm*—Robert Lieber; Winfield J. Brown, Jr.

[57] ABSTRACT

In a computer system accessible via a keyboard—in which the keyboard and system are supposed to reset automatically in reaction to power outages or other disturbances lasting for longer than a first period of time, in which the keyboard and system are generally unaffected by power outages or other disturbances lasting for less than a second period of time less than said first period, and in which lockouts can occur during system power outages or other disturbances lasting for a time greater than said second period and less than said first period—an anti-lockout circuit is interposed between a DC low voltage output port of the system and a DC voltage input port of the keyboard. This circuit is powered by the low DC voltage appearing at said output port and operates in response to small changes in that voltage to switchably interrupt transfer of that voltage to the keyboard input port. When the output voltage falls below a predetermined voltage level at which the system is required to reset itself, the subject circuit interrupts transfer of the output voltage to the keyboard and delays reinstatement of the transfer for a period of time at least sufficient to ensure that the keyboard circuits will reset.

6 Claims, 2 Drawing Sheets

KEYBOARD ANTI-LOCKOUT CIRCUIT

SUMMARY OF THE INVENTION

In personal computer systems, fluctuations in power may give rise to conditions requiring resetting of the system, and short term fluctuations may require special actions in order to avert lockup of the system microcomputer.

This problem has been recognized in the art, as exemplified by the disclosure in U.S. Pat. 4,771,356 to S. D. Hastings. In the Hastings patent, AC power is removed from the system if the power disturbance is longer than a half cycle of AC recurrence (about 0.008 seconds) and restoration of AC power and resetting of the system are delayed for at least 5 seconds to prevent microcomputer lockup. It is further recognized in Hastings that although lock-up conditions occur infrequently, and can be removed by having a system user manually turn power off and then on, this is not a feasible form of correction for systems expected to operate in an unattended environment. Thus, it is necessary at least in such environments to have automatic resetting facilities.

In the Hastings solution, a circuit interposed between the microcomputer system and its source of AC power monitors the AC line condition and detects when the duration of an outage or other disturbance effectively exceeds a half cycle of AC repetition (0.008 seconds). Upon detecting such, the interposed circuit effectively opens a (triac) switch in the AC delivery path to the system and keeps that switch open for at least 5 to 7 seconds; ostensibly a period long enough to require the system to reset when power is reapplied and yet preclude development of a lock-up condition.

The present invention is concerned with a species of power related microcomputer system disablement, which may be troublesome in unattended environments and yet is susceptible of a simpler, more efficient and more economical solution than the one presented by Hastings. The disablement problem presently of concern occurs when a system microcomputer resets and its keyboard fails to reset. As noted presently, the keyboard draws its power from a source of regulated low DC voltage (about 5 volts) in the system and the keyboard intelligence is supposed to be responsive to variations in that voltage to reset whenever the system resets. However, depending upon keyboard circuit impedances and system loading, the indication of voltage presented to the keyboard circuits controlling resetting may not correspond to the system voltage indication determining system resetting.

In such circumstances, the system may reset while the keyboard does not. When this occurs, keyboard circuits are unable to respond to signals presented by the system, while the latter is rebooting after its reset, and as a result the system—although not in a lock-up condition itself—posts an error and places itself in a stopped state preventing it from performing any useful operations. This condition presently is termed a lockout.

The object of the present invention is to eliminate such lockouts in existing system installations; particularly installations required to operate at least part-time in an unattended mode. This object is realized by interposing a special anti-lockout circuit between the keyboard and its source of low voltage DC power in an outlet at the system.

A feature of the present anti-lockout circuit relative to the delay circuit of Hastings is that the present circuit is powered from the low DC voltage system outlet which provides the keyboard DC supply voltage (i.e. by a voltage expected to vary between 0 and 5 volts DC), whereas the Hastings power interruption circuit has its own DC power supply.

Another feature of the present anti-lockout circuit is that it employs highly sensitive operational amplifiers and a transistor switch to control a low voltage relay in the path between the system DC voltage outlet and the keyboard. Thus, when voltage at the system outlet falls below a predetermined level at which the system would unambiguously be required to reset (about 4.6 volts DC), the present operational amplifiers act to turn off the transistor switch which in turn opens the relay contact.

The relay contact is then held open until system DC voltage rises above 4.6 volts, and after an additional circuit delay imposed by the present operational amplifiers (1 to 2.5 seconds presently) the transistor switch is turned on and the relay contact is closed. This additional delay is selected based on empirical observations of disturbance durations associated with keyboard induced lockouts.

These observations indicate that in systems having a "power holdup" feature discussed later, and lacking the present anti-lockout circuit, keyboard related lockouts occur only when durations of power outage or other disturbances are in a time range from about 0.1 to 0.6 seconds. Below this range, both the system and keyboard are unaffected (i.e. continue to run without resetting), and above this range both units apparently reset unambiguously.

Thus it is found sufficient presently to eliminate lockouts by delaying reclosure of the present relay contact for about 1 to 2.5 seconds (rather than the much longer time of 5 to 7 seconds used by Hastings to delay restoration of system AC power). Naturally, the shorter the delay the shorter the interruption of useful system processing. Furthermore, in systems which are attended part-time and unattended at other times, a longer delay might appear to an attendant as a system failure requiring operation of the system on-off switch (which could then further delay useful system operation).

A feature of the invention is that the delay provided by the subject anti-lockout circuit is sufficient to ensure decay of capacitively stored supply voltage indications at the keyboard to a level below the reset voltage threshold of the keyboard. This is important since it ensures that when the relay contact in the subject circuit is reclosed, the keyboard circuitry is presented with a voltage that will then rise smoothly through the reset threshold (at a rate dependent upon the impedance of the keyboard circuits; especially for keyboards of different make).

In many systems, including IBM PS/2 systems, the system power supply is designed to capacitively retain regulated DC outputs for short "holdup" intervals and thereby "ride through" short term AC power disturbances lasting for less than the "holdup" time (typically disturbances lasting for 0.1 seconds or less). Although this does not entirely prevent the above-mentioned keyboard related lockout occurrences, it does serve to protect the system microcomputer from lockup as well as from being reset more frequently. Thus, in contrast to the arrangement presented by Hastings, wherein reset action is instituted for AC outage times as small as 0.008 seconds, systems having the foregoing holdup feature reset only for much longer disturbances.

In such systems, the voltage presented at the DC outlet to the keyboard will not fall below the threshold detected by the present anti-lockout circuit if the disturbance is shorter than the system power holdup time, and therefore the present circuit is effectively reactive only to AC disturbances lasting longer than the system power holdup time. This means of course that the system and keyboard are not as frequently driven to undergo resets as they would be in a system lacking a power holdup feature. Accordingly, a feature of the present anti-lockout circuit is that in reacting to the DC level presented at the system to keyboard outlet the keyboard will not reset unless the system does, and in systems with power holdup this means that both the system and its keyboard will not be reset for system AC power disturbances lasting less than the holdup time.

Lockout also can occur when other input devices are present; e.g. a mouse. The time range for such occurrences is generally smaller than that associated with keyboard related lockouts. Hence the possibility of lockout occurrence is correspondingly smaller. Nevertheless, the present anti-lockout circuit can be shared between a keyboard and mouse or other input device so as to positively interrupt the transfer of supply voltage from the system to both devices, and thereby prevent system lockout occurrences relative to both.

Another feature of the present invention is that it provides an economical means to eliminate lockout problems in existing installations of unattended microcomputer systems and keyboards. Although such problems are correctable by replacement of the existing keyboards with keyboards designed specifically to react more quickly to variations in system DC voltage, the cost of the present circuit is considerably less than that of a keyboard.

The foregoing and other features, objects and advantages of the present invention will be more fully understood and appreciated by considering the following detailed description and claims.

DETAILED DESCRIPTION

Figure 1:
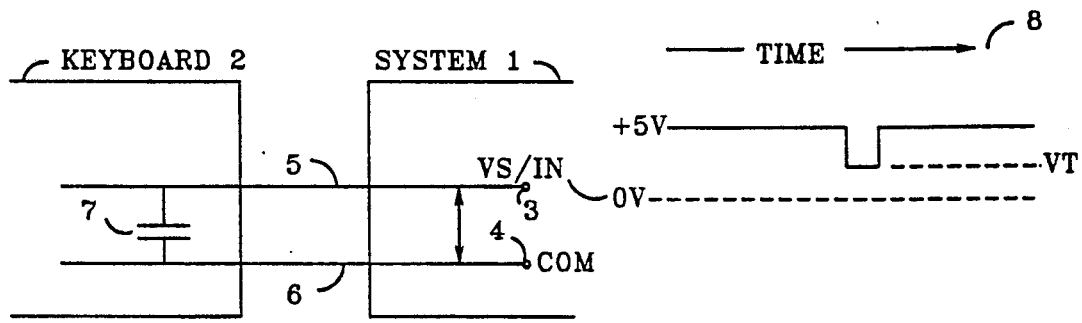
FIGS. 1 and 2 schematically illustrate the lockout problem addressed by the present invention.

Referring to FIG. 1, system 1 and keyboard 2 are ordinarily directly interconnected for transfer of D.C. supply voltage from the system to the key board and for bidirectional exchange of information/logic signals. D.C. supply voltage ports 3 and 4 on the system side extend via respective leads 5 and 6 to corresponding unnumbered. voltage ports on the keyboard side. Leads 5 and 6 transfer D.C. supply voltage VS/IN to the keyboard; the voltage on lead 5 being referenced to a common potential on lead 6. VS/IN is developed from e.g. A. C. utility power in a not-shown power supply unit housed in the system.

Other not-shown leads carry information signals bidirectionally between the system and keyboard. Capacitance 7 schematically represents the capacitive component of the internal impedance of the keyboard. The rate at which voltage stored on capacitance 7 decays when VS/IN drops is a function of the impedance present at the keyboard unit. Furthermore, the indication of supply voltage presented to keyboard circuits which control resetting action is isolated from the actual supply voltage existing across capacitance 7 and thus subject to different capacitance and charging impedance conditions.

In general, it should be understood that the indication of supply voltage which determines keyboard reset action may not instantaneously track a drop in actual system supply voltage, and due to this, it is possible to encounter circumstances in which a system will reset and the keyboard does not.

As shown at 8, VS/IN at system port 3 nominally is regulated to stabilize at a level of about +5 volts relative to common potential at port 4. VT is a threshold voltage less than +5 volts at which the system acts to reset and reboot itself. If VS fluctuates but remains above VT, neither the system not the keyboard is affected and their circuits continue operating normally. If VS/IN varies through Vt, not-shown circuits and software in the system operate to reset and reboot the latter. At such times, supply voltage at the keyboard is supposed to track that at port 3 and circuits in the keyboard unit are supposed to operate to reset that unit. However, it is under stood that since tracking is not instantaneous due to the capacitance 7, such reset action at the keyboard would vary depending on the actual keyboard design and system power load.

Figure 2:
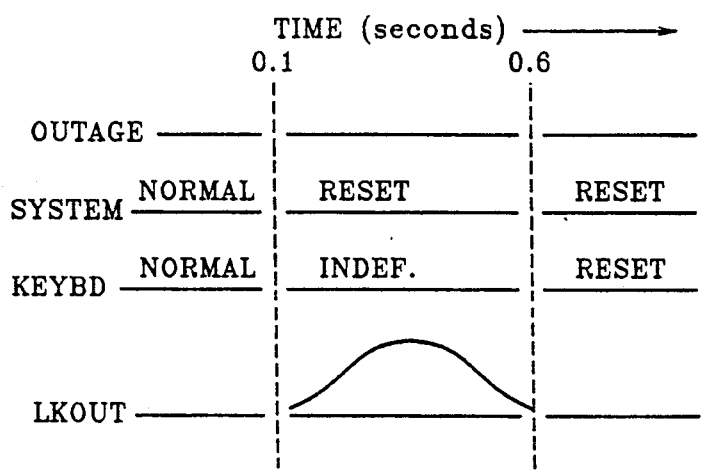

FIG. 2 illustrates the dependence of keyboard operating states relative to the system as a function of durations of AC power disturbances. Here it is assumed that the system power supply has a "holdup feature" allowing it to ride through AC power disturbances lasting less than about 0.1 seconds. As explained earlier, such holdup feature permits the system power supply to reliably hold DC regulated voltage at levels acceptable for continued system operation during AC disturbances shorter than the holdup time. In this environment, both the system and keyboard are unaffected by AC disturbances lasting less than about 0.1 second, and continue normal operation when such disturbances occur; i.e. no reset is performed and no data is lost.

For outages longer than about 0.6 seconds, both the system and keyboard unambiguously reset. In such instances the system will reboot, and therefore data in volatile memory is lost; but the system is able to load programs and initiate new tasks.

In the range between 0.1 and 0.6 seconds, the system unambiguously resets, and without the present anti-lockout circuit the keyboard may or may not reset depending on whether its capacitively retained DC voltage does or does not decay below VT.

As explained earlier, if the keyboard fails to reset when the system does, the system while rebooting and interrogating the keyboard, will fail to receive a proper response, post/display an error indication and transfer to a stopped state preventing any further useful operation of the system and its dependent attachments. As shown in FIG. 2, in the power supply with holdup environment presently contemplated, probability of lockout is non-zero between 0.1 and 0.6 seconds and virtually zero outside of that range.

As mentioned previously, recovery from lockout error in systems lacking the present circuit requires a user to manually operate the system power switch off and then back on. This however may be unfeasible or inconvenient in unattended systems; e.g. those connected to networks operating at least part-time without human attendance.

Figure 3:
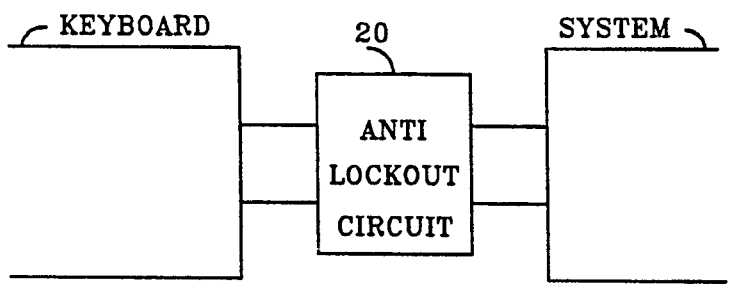
FIG. 3 illustrates the deployment of the subject lockout circuit relative to a system and keyboard.

As shown in FIG. 3, the alternative offered by the present invention is to prevent such systems from reaching lockout condition by interposing an anti-lockout circuit 20 designed specifically for that purpose.

Figure 4:
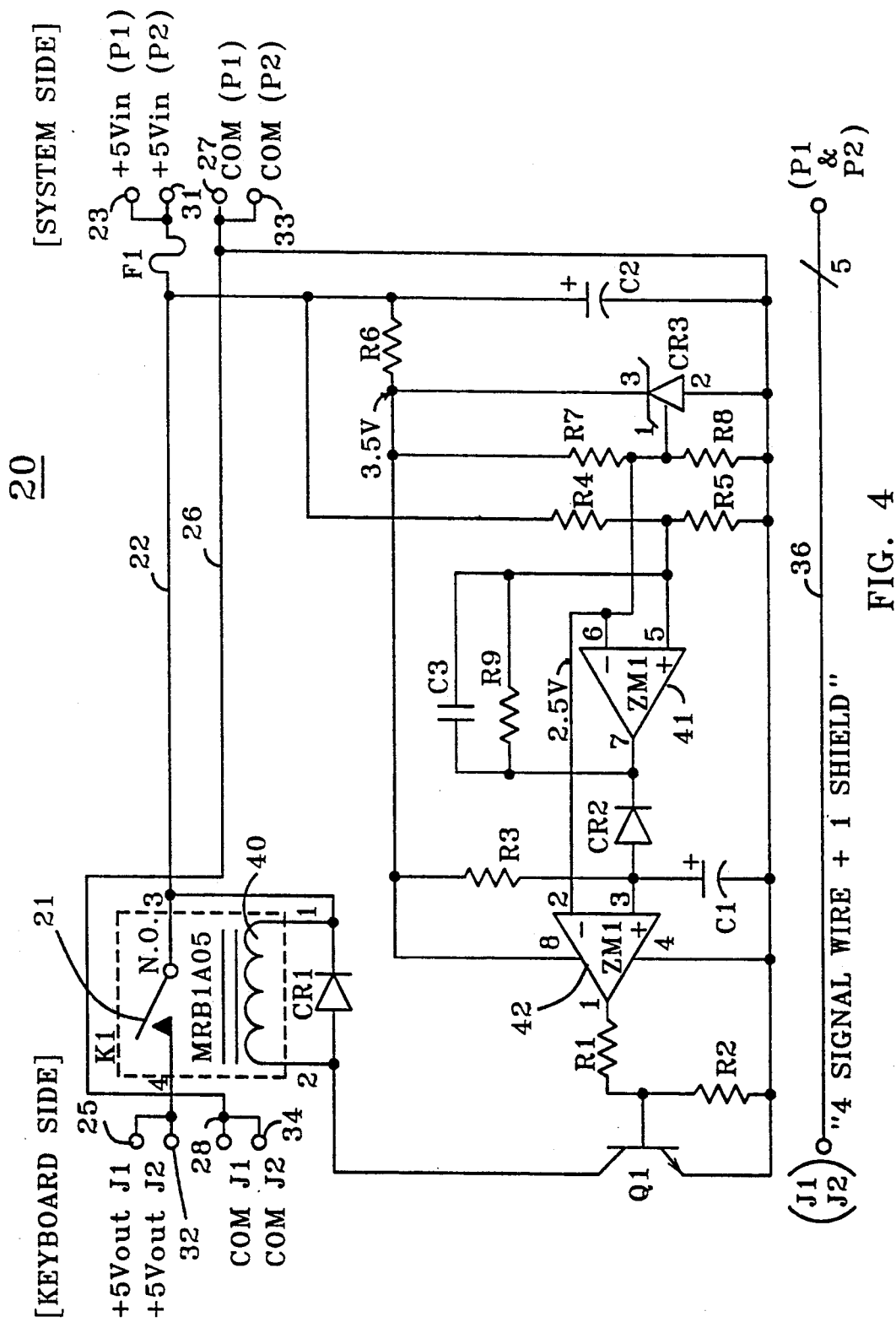
FIG. 4 illustrates a preferred embodiment of an anti-lockout circuit designed in accordance with the invention.

Details of circuit 20 are shown and described with respect to FIG. 4. In essence, this circuit interrupts continuity from the source 3 of VS/IN on the system side to the keyboard, whenever VS/IN falls below the threshold level VT at which the system would reset, and prevents restoration of continuity in the same path for a period longer than the 0.6 seconds associated with non-zero probability of lockout. This ensures that supply voltage capacitively stored at the keyboard will have decayed below VT before restoration of continuity, thereby ensuring that the keyboard circuits will definitely reset whenever the system does.

Referring to FIG. 4, contact 21 in relay K1 and conductor 22 provide a path with interruptible continuity between supply voltage port 23 in the system and a corresponding port 25 in the keyboard unit. Conductor 26 provides a continuous conduction path between common port 27 in the system and a corresponding common port 28 in the keyboard. Fuse F1 is provided as a safety measure to prevent fire or other hazardous conditions in the event of component failure in the keyboard or in the active circuits in anti-lockout unit 20.

Other ports 31–34 in the system and keyboard are used for controllably transferring VS to an additional input device such as a mouse, if present, with the same lockout avoidance purpose as relative to the keyboard.

Five signal conductors indicated collectively at 36 serve to transfer signals between the keyboard and additional mouse or other input device and the system (2 signal leads and a shield conductor for the keyboard and 2 signal leads and the same shield for the additional mouse device if present). The conductors 36, their terminations, and their usage are not relevant to the present discussion, but are shown for completeness.

Closed and opened states of relay contact 21 are determined by conduction states of transistor Q1. When power conditions are stable, Q1 conducts providing sufficient current through coil 40 in K1 to keep contact 21 in closed position, thereby providing continuity between system port 23 and keyboard port 25. Diode CR1 prevents build-up of reverse potential on coil 40 when Q1 stops ceases conducting causing contact 21 to open. The conduction state of Q1 is determined by states of operational amplifiers 41 and 42, and associated resistive components R1 through R9 and capacitances C1 through C3. Numbers 5–7 at inputs and outputs of amplifier 41 denote pin numbers (5, 6 are input pin numbers and 7 is the output pin number. Similarly, numbers 1–4 and 8 indicate pin numbers of operational amplifier 42.

In the preferred embodiment, suitable values of the above resistive and capacitive components (in kilohms for resistors and microfarads for capacitors) are:
R1=1, R2=10, R3=100, R4=1, R5=1.13, R6=0.05
R7=10, R8=24.9, R9=100, C1=10, C2=10, C3=0.33

Suitable types for relay K1, transistor Q1, Diode CR3 and amplifiers 41 and 42 are:

| K1: | +5 V Relay |
| --- | --- |
| Q1: | 2N2222 transistor |
| CR3: | TL 431 |

-continued

| Amp 41: | LM 358 |
| --- | --- |
| Amp 42: | LM 358 |

When system power is stable, supply voltage at 23 is regulated nominally at +5 volts. That voltage is divided by resistors R6 through R8, providing reference regulated voltages of +3.5 and +2.5 volts at respective junctures of R6 and R7 and R7 and R8. Resulting states of amplifiers 41 and 42 provide a level of conduction through the divider formed by resistors R1 and R2 which is sufficient to maintain Q1 conducting and relay contact 21 closed.

At initial system power up, the +3.5 and +2.5 reference voltages come up before system supply voltage stabilizes at +5 volts. Pin 7 of operational amplifier 41 is initially low keeping C1 discharged. As voltage at 23 builds to a nominal reset threshold level VT of about +4.6 volts, voltage transferred from the divider formed by resistors R4 and R5 to pin 7, via amplifier 41 and C3 and R9, rises into the range +3 to +3.5 volts (C3 and R9 are chosen to provide hysteresis for amplifier 41). Diode CR2 prevents voltage at pin 7 of ZM1 from charging C1, and the latter slowly charges through the delay path formed by R3 and C1; its voltage rising to +2.5 volts after a delay of between 1 to 2.5 seconds. At this point, amplifier 42 passes sufficient current through R1 and R2 to cause transistor Q1 to conduct, actuating coil 40 to close contact 21 and transfer +5 volts supply voltage to the keyboard.

If power outage occurs while the system is running, and voltage at 23 drops below +4.6 volts (level VT), voltage at pin 7 of amplifier 41 drops sufficiently to cause C1 to discharge quickly through CR2 and the impedance presented at the output of amplifier 41. In turn, this quickly terminates conduction of Q1 opening contact 21 and removing the system supply voltage from the keyboard. When voltage at 23 subsequently rises above +4.6 volts, the system resets and while this is occurring C1 recharges to 25 volts, subject to the abovementioned 1 to 2.5 seconds delay, at which point Q1 again conducts closing contact 21.

The 1 to 2.5 seconds delay ensures that any voltage capacitively stored at the keyboard will have decayed at least below the 4.6 volt level at which the keyboard circuits reset. Thus, when +5 volts is reapplied from system port 23 to keyboard port 25 (after the 1 to 2.5 seconds delay), operating voltage at the keyboard must rise through +4.6 volts instigating resetting action in the keyboard circuits.

On the other hand if the outage was not long enough to cause the voltage at 23 to drop below +4.6 volts, the system circuits would not have reset and the foregoing actions would not have occurred (i.e. contact 21 would not have opened and reclosed). Thus, the keyboard circuits would not have reset or otherwise reacted.

Thus it is understood that: (1) contact 21 is normally closed when system supply voltage is stable in a range above the threshold level of +4.6 volts; (2) the circuits of FIG. 4 operate to open contact 21, when system outage duration is sufficient to cause a system reset (i.e. sufficient to allow system supply voltage to decay below 4.6 volts), and to keep the contact open long enough (1 to 2.5 seconds) to guarantee decay of any voltage capactively stored at the keyboard below +4.6 volts; so that (3) upon reclosure of contact 21 the keyboard circuits are subjected to a supply voltage rising through the +4.6 volt level at which they must react by resetting.

If a mouse or other auxiliary input device is attached to the system, ports 32 and 34 are attached to that device, so that if system VS/IN drops below 4.6 volts application of supply voltage to that device will be interrupted for at least 1 second. This is sufficient to guarantee decay of any capacitively retained voltage at the device below the 4.6 volt level and thereby guarantee that reset circuits in such device will be properly conditioned to perform the requisite reset operation.

What is claimed is:

1. An anti-lockout circuit, connectable between a computer system and an input device for the computer system which attaches externally to the system and derives power from the system in the form of a low DC voltage produced by a power supply integrally located in the system, said circuit comprising:

switch means connected in series circuit between a DC voltage output, port of the system and a DC voltage input port of said input device;

detecting circuit means coupled to said DC voltage output port, and powered by the DC output voltage appearing at said port, for detecting when said DC output voltage drops below a predetermined voltage level at which said system would automatically reset; and switch control circuit means coupled to said DC voltage output port, and powered by the DC output voltage appearing at said port, said switch control means further being coupled to said detecting circuit means and said switch means for controlling opening and closing operations of said switch means serving to transfer DC voltage from said system output port to said device input port, said switch control circuit means operating to hold said switch means continuously in a closed state, serving to transfer voltage to said input device, while said supply voltage is steadily at a level above said predetermined voltage level, and for operating said switch means to an open condition serving to temporarily interrupt transfer of supply voltage from said system output port to said input device input port, for a period of time at least sufficient to ensure that said input device will reset itself, when said output voltage falls below said predetermined level.

2. A circuit in accordance with claim 1 wherein said input device is a keyboard.

3. A circuit in accordance with claim 2 wherein said period of time during which said switch is operated in said open condition is at least 1 second.

4. A circuit in accordance with claim 2 wherein said DC voltage produced at said system output port is designed to stabilize at a level of about 5 volts DC, and said predetermined level is about 4.6 volts.

5. A circuit in accordance with claim 4 wherein said switch means is a low voltage relay.

6. A circuit in accordance with claim 5 wherein said detecting circuit means comprises an operational amplifier operable at a supply voltage of about 4 volts DC and sensitive to a change of about 0.4 volts in its supply voltage to effect action relative to said switch control circuit means.

* * * * *